(12) United States Patent
Heo et al.

(10) Patent No.: US 10,681,270 B2
(45) Date of Patent: Jun. 9, 2020

(54) ELECTRONIC DEVICE FOR CREATING PANORAMIC IMAGE OR MOTION PICTURE AND METHOD FOR THE SAME

(71) Applicant: Samsung Electronics Co., Ltd., Gyeonggi-do (KR)

(72) Inventors: Yoon Jeong Heo, Gyeonggi-do (KR); Ievgen Zaichuk, Kiev (UA); Ki Hwan Choi, Gyeonggi-do (KR); Jin Joo Park, Seoul (KR); Stephanie Kim Ahn, Seoul (KR); Si Hyoung Lee, Gyeonggi-do (KR); Ji Yoon Park, Gyeonggi-do (KR); Jung Eun Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/889,413

(22) Filed: Feb. 6, 2018

(65) Prior Publication Data

US 2018/0227487 A1 Aug. 9, 2018

(30) Foreign Application Priority Data

Feb. 6, 2017 (KR) .................. 10-2017-0016395

(51) Int. Cl.
*H04N 5/00* (2011.01)
*G06T 3/00* (2006.01)
(Continued)

(52) U.S. Cl.
CPC ....... *H04N 5/23238* (2013.01); *G06T 3/4007* (2013.01); *G06T 3/4038* (2013.01);
(Continued)

(58) Field of Classification Search
CPC .......... H04N 5/23238; H04N 5/23232; H04N 5/23258; G06T 3/4007
(Continued)

(56) References Cited

U.S. PATENT DOCUMENTS 8,106,936 B2    1/2012 Strzempko et al.
8,687,071 B2    4/2014 Yamaji
(Continued)

FOREIGN PATENT DOCUMENTS

EP    2 242 252 A2    10/2010
GB    2517730 A       3/2015
(Continued)

OTHER PUBLICATIONS

International Search Report dated Jul. 11, 2018.
(Continued)

*Primary Examiner* — Jeffery A Williams
(74) *Attorney, Agent, or Firm* — Cha & Reiter, LLC.

(57) ABSTRACT

An electronic device comprises a camera; a sensor configured to sense a motion; and one or more processors, wherein the one or more processors are configured to: sequentially acquire a plurality of images using the camera and acquire motion information of the plurality of images using the sensor, during a specified time; create a panoramic image with a first image sub-set comprising a portion of the plurality of images and a second image sub-set comprising another portion of the plurality of images, and moving picture data related to the panoramic image; and determine whether to correct at least a partial section of the moving picture data using a particular image from the second image sub-set that corresponds to the at least the partial section of the moving picture data, based on the frame rate of the at least the partial section of the moving picture data.

7 Claims, 15 Drawing Sheets

(51) Int. Cl.
*H04N 5/232* (2006.01)
*G06T 3/40* (2006.01)

(52) U.S. Cl.
CPC ..... *H04N 5/23232* (2013.01); *H04N 5/23245* (2013.01); *H04N 5/23254* (2013.01); *H04N 5/23258* (2013.01); *H04N 5/23267* (2013.01); *H04N 5/23293* (2013.01)

(58) Field of Classification Search
USPC .......................................................... 348/36
See application file for complete search history.

(56) References Cited

U.S. PATENT DOCUMENTS

| | | |
|---|---|---|
| 8,947,502 B2 | 2/2015 | Mashiah |
| 2007/0030396 A1 | 2/2007 | Zhou et al. |
| 2007/0081081 A1 | 4/2007 | Cheng |
| 2008/0111831 A1 | 5/2008 | Son et al. |
| 2009/0058988 A1 | 3/2009 | Strzempko et al. |
| 2010/0265313 A1 | 10/2010 | Liu et al. |
| 2011/0074977 A1 | 3/2011 | Yamaji |
| 2011/0110605 A1 | 5/2011 | Cheong |
| 2011/0285810 A1* | 11/2011 | Wagner .............. H04N 5/23238 348/36 |
| 2011/0316970 A1 | 12/2011 | Cheong |
| 2015/0149960 A1 | 5/2015 | Song et al. |
| 2015/0181115 A1 | 6/2015 | Mashiah |
| 2016/0212337 A1 | 7/2016 | Sagas et al. |

FOREIGN PATENT DOCUMENTS

| | | |
|---|---|---|
| JP | 2010-124088 A | 6/2010 |
| JP | 2011-076372 A | 4/2011 |
| KR | 10-2006-0050351 A | 5/2006 |
| KR | 10-0900342 B1 | 6/2009 |
| KR | 10-2015-0059534 A | 6/2015 |

OTHER PUBLICATIONS

European Search Report dated Nov. 8, 2019.
Fadaeieslam, et al.; "Efficient key frames selection for panorama generation from video"; Journal of Electronic Imaging; Apr.-Jun. 2011.
European Search Report dated Feb. 18, 2020.

\* cited by examiner

ELECTRONIC DEVICE FOR CREATING PANORAMIC IMAGE OR MOTION PICTURE AND METHOD FOR THE SAME

CLAIM OF PRIORITY

This application claims the benefit under 35 U.S.C. § 119(a) of a Korean patent application filed on Feb. 6, 2017 in the Korean Intellectual Property Office and assigned Serial number 10-2017-0016395, the entire disclosure of which is hereby incorporated by reference.

TECHNICAL FIELD

The present disclosure relate to an electronic device capable of providing a panoramic image.

BACKGROUND

In general, an electronic device may acquire an image based on a focal length and an angle of view (in the range of 30° to 50°) of a lens. The image acquired by the electronic device represents an angle of view narrower than an angle of view (in the range of 150° to 200°) of a human being. The image, therefore only provides a small portion of what a user would see if the user were present at the time and location of the image capture. This drastically limits the usage of the acquired image in virtual reality (VR) applications.

SUMMARY

An electronic device may create a panoramic image. A panoramic image may represent a wide angle of view (such as the angle of view of a human) by spatially connecting several images, which are captured at various angles, to each other. The electronic device may create a motion panoramic image by overlapping and temporally displaying image frames for a space among image frames.

The electronic device may create the motion panoramic image, which includes a smaller number of image frames but is similar to the moving picture, by using image frames constituting a still panoramic image. The motion panoramic image may more or less represent the motion of a captured target by using a smaller number of image frames.

A photographer who is capturing a panoramic image may stay or slowly move in a certain capture space and may swiftly move in another capture space. Although the photographer tries to maintain a uniform moving speed in capturing, this is unlikely to actually occur. Accordingly, image frames of the moving picture created by the electronic device may include a non-uniform distribution of images of the capture spaces. Therefore, conventionally, in the case that the motion panoramic image is created by using still panoramic images, the motion of the captured target may not be natural when the motion panoramic image is reproduced.

Aspects of the present disclosure may address at least the above-mentioned problems and/or disadvantages and to provide at least the advantages described below. Accordingly, an aspect of the present disclosure is to provide an electronic device capable of supporting creation and reproduction of more natural motion panoramic image.

In accordance with an aspect of the present disclosure, an electronic device comprises a camera; a sensor configured to sense a motion; and one or more processors, wherein the one or more processors are configured to: sequentially acquire a plurality of images using the camera and acquire motion information of the plurality of images using the sensor, during a specified time; create a panoramic image with a first image sub-set comprising a portion of the plurality of images and a second image sub-set comprising another portion of the plurality of images, and moving picture data related to the panoramic image; and determine whether to correct at least a partial section of the moving picture data using a particular image from the second image sub-set that corresponds to the at least the partial section of the moving picture data, based on the frame rate of the at least the partial section of the moving picture data.

In accordance with another aspect of the present disclosure, an electronic device comprises a memory; a camera configured to capture a moving picture comprising a plurality of image frames; and one or more processors, wherein the one or more processors is configured to: create a still panoramic image by using first image frames selected from among the plurality of image frames of the moving picture and store the still panoramic image in the memory; create a motion panoramic image by using the first image frames and second image frames including at least another portion of the plurality of image frames and store the motion panoramic image in the memory; and form the motion panoramic image by matching the first image frames using the second image frames such that the first image frames include overlap areas having less than a threshold size, wherein overlap areas between the first image frames have irregular sizes motion panoramic image motion panoramic image motion panoramic image. In accordance with another aspect of the present disclosure, an electronic device may include a display, a motion sensor which senses a motion of the electronic device, a memory which stores a motion panoramic image created by using image frames constituting a still panoramic image, and a processor. The processor may be configured to determine a motion direction, a motion speed, and an angle of yaw, based on information received from the motion sensor, if a present mode is a specified reproduction mode, and reproduce image frames constituting the motion panoramic image in a reproduction direction, which corresponds to the motion direction, from an image frame corresponding to the angle of yaw and at a selection reproduction speed corresponding to the motion speed.

According to various embodiments disclosed in the present disclosure, there may be provided the motion panoramic image of more naturally expressing the motion of the captured target when the motion panoramic image is reproduced.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Hereinafter, certain embodiments of the present disclosure may be described with reference to accompanying drawings. Accordingly, those of ordinary skill in the art will recognize that modifications, equivalents, and/or alternatives on the various embodiments described herein may be made without departing from the scope and spirit of the present disclosure.

The terms of a singular form may include plural forms unless otherwise specified. In the present disclosure, the expressions "A or B", "at least one of A and/or B", "A, B, or C", or at least one of "A, B and/or C" may include all possible combinations of one or more of the associated listed items. The terms such as "first", "second", and the like used herein may refer to various elements regardless of the order and/or priority of the elements and may be used to distinguish an element from another element, not to limit the elements. It will be understood that when an element (e.g., a first element) is referred to as being "(operatively or communicatively) coupled with/to" or "connected to" another element (e.g., a second element), the element may be directly coupled with/to or connected to the another element or an intervening element (e.g., a third element) may be present there between.

In the present disclosure, according to the situation, the expression "adapted to or configured to" used herein may be interchangeably used with, for example, the expression "suitable for", "having the capacity to", "changed to", "made to", "capable of" "designed to", or "adapted to". Under a certain situation, the expression "a device configured to" may mean that the device is "capable of" operating together with another device or other components. For example, a "processor configured to (or adapted to) perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device. The term "image" shall also include a cropped image or portion of an image. It shall be understood that statements made in this detailed description concern certain embodiments, and may not necessarily apply to all embodiments that are covered by the claims.

Figure 1:
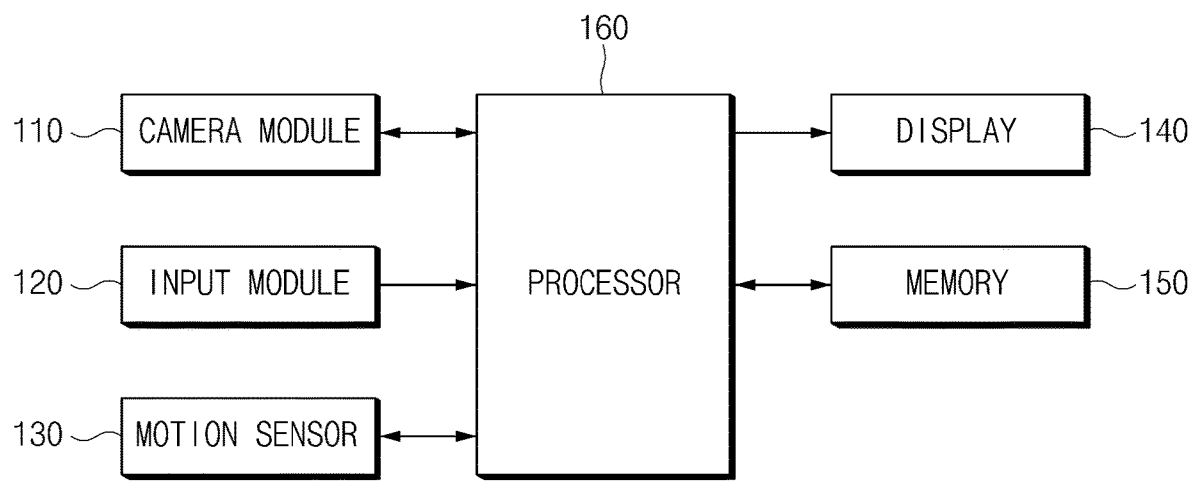
FIG. 1 is a block diagram illustrating an electronic device, according to an embodiment of the present disclosure.

FIG. 1 is a block diagram illustrating an electronic device, according to an embodiment.

Referring to FIG. 1, according to an embodiment, an electronic device 10 may include a camera module 110, an input module 120, a motion sensor 130, a display 140, a memory 150, and a processor 160. In some embodiments, some elements may be omitted or additional elements may be provided. In addition, according to an embodiment, some of the elements may be combined with each other so as to form one entity and the functions of the elements may be performed in the same manner as before the combination. The input and output relationship described with reference to FIG. 1 is illustrated for the convenience of explanation, but the embodiment is not limited thereto.

The camera module 110 for capturing a still image or a moving picture may include, for example, at least one image sensor (e.g., a front sensor or a rear sensor), a lens, an image signal processor (ISP), or a flash (e.g., an LED or a xenon lamp). The camera module 110 may be used to create at least one of a still panoramic image or a motion panoramic image.

The input module 120 may receive a user input for manipulating the electronic device 10. For example, the input module 120 may include at least one of a touch sensor, an input button, or a communication unit. The touch sensor may sense the touch of a user and may output touch coordinates corresponding to the sensed touch. For example, the touch sensor may include at least one of a touch pad (or a touch panel) or a touch control unit. The touch pad may be a touch screen. The input button may be a button (e.g., a power key) provided in the electronic device 10. The communication unit may communicate with an external electronic device connected with the communication unit through a first interface. The communication unit may communicate with the external electronic device in a universal serial bus (USB) scheme. The communication unit may convert a signal received from the external electronic device into a signal analyzable by the processor 160. The communication unit may convert a signal received from the processor 160 into a signal corresponding to a communication scheme with the external electronic device and may transmit the converted signal through the first interface. The external electronic device may be, for example, a virtual reality (VR) appliance (for example, a head mount unit).

The motion sensor 130 may sense the motion of the electronic device 10 and may output motion information. For example, the motion sensor 130 may include at least one of a gyro sensor, an acceleration sensor, or a geomagnetic sensor. The gyro sensor may sense a 3-axis angular velocity and may output 3-axis angular velocity information. The acceleration sensor may sense a 3-axis acceleration and may output acceleration information. The geomagnetic sensor may sense geomagnetic information (e.g., a geomagnetic direction and geomagnetic strength).

The motion sensor 130 may include a plurality of sensors. For example, the motion sensor 130 may include a first sensor provided in the electronic device 10 and a second sensor provided in the external electronic device (e.g., a head mount unit) connected with the electronic device 10 through the first interface. The second sensor may have higher sensitivity than the sensitivity of the first sensor. For example, the sampling rate of the first sensor may be a first sampling rate (e.g., 300 samples/sec) and the sampling rate of the second sensor may be a second sampling rate (e.g., 1000 samples/sec) exceeding the first sampling rate.

The display 140 may include, for example, a liquid crystal display (LCD), a light-emitting diode (LED) display, an organic LED (OLED) display, an electronic paper display, or a curved display. The display 140 may display, for example, various contents (e.g., a text, an image, a video, an icon, a symbol, and/or the like) to a user. According to an embodiment, the display 140 may display a moving picture, a still panoramic image, or a motion panoramic image. For example, the display 140 may display the moving picture in a moving picture capturing mode. For another example, the display 140 displays a still panoramic image in a display mode for the still panoramic image. For another example, the display 140 may display a motion panoramic image in a general reproduction mode or a VR reproduction mode. The modes may be switched to each other by, for example, a user input.

The memory 150 may be a volatile memory (e.g., a random access memory (RAM), or the like), a non-volatile memory (e.g., a read-only memory (ROM), a flash memory, hard disc drive, or the like), or the combination thereof. For example, the memory 150 may store instructions or data associated with at least one other component(s) of the electronic device 10. The memory 150 may store instructions for creating a still panoramic image and a motion panoramic image in a panorama capturing mode. The memory 150 may store instructions for adjusting pixel distances (overlap area) of image frames constituting the motion panoramic image or an image frame rate of the image frames. The memory 150 may store instructions for interpolating the motion panoramic image. The memory 150 may store a still panoramic image, motion panoramic image, spare image frames, and a motion panoramic image. Spare image frames may include at least one of image frames of a moving picture which are to be used to form the moving panoramic and not involved in the motion panoramic image.

The processor 160 may include, for example, at least one of a central processing unit (CPU), a graphics processing unit (GPU), a microprocessor, an application processor (AP), an application specific integrated circuits (ASICs), or a field programmable gate array (FPGA), or may have a plurality of cores. The processor 160 may control at least one of the other elements of the electronic device 10 and/or perform computation or data processing related to communication. Additionally, it shall be understood that functions performed by the processor 160 can be performed by one or more processor. Thus future references to "processor 160" shall be understood to also include "more than one processor."

The processor 160 may allow the camera module 110 to capture moving pictures in the panorama capturing mode. The moving picture may further include at least one of pictures from moving positions and pictures captured during moving object. The processor 160 may form the still panoramic image based on at least one of an image change or a capture location movement during capturing the moving pictures (or after the capturing of the moving picture). The still panoramic image may be created as a plurality of image frames, which are captured by the camera module 110 and have various angles of view, are mapped (matching) in a specified form to a virtual space. The still panoramic image may have an angel of view exceeding an angle of view of the camera module 110.

For example, the processor 160 may compare a present image frame of the moving pictures with a previous image frame of the moving pictures based on at least one of an image feature value or a motion vector and may select the present image frame if the image change is equal to or greater than a first threshold change according to the comparison result. For another example, the processor 160 may select the present image frame if determining the capture location movement to be equal to or greater than a second threshold change by using the motion information obtained from the motion sensor 130. After the present image frame is selected, the processor 160 may create and update a still panoramic image by matching the previous image frame to the present image frame such that boundary parts of the previous image frame and the present image frame appropriately overlap together.

The processor 160 may crop the present image frame such that the previous image frame and the present image frame have continuity therebetween and may update the still panoramic image including the previous image frame and the present image frame. In addition, the processor 160 may crop the previous image frame by taking into consideration the continuity with the present image frame.

The processor 160 may create a motion panoramic image by using the still panoramic image. As described above, the still panoramic image may be created by extracting some from image frames from moving positions captured in the panorama capturing mode, cropping the extracted image frames, and matching the cropped image frames to each other such that the boundaries of the cropped image frames are connected to each other. Therefore, according to an embodiment, the processor 160 may create the motion panoramic image allowing the image frames (hereinafter, referred to as "panoramic image frames"), which are used to form the still panoramic image, to be sequentially reproduced. The motion panoramic image includes a smaller number of image frames as compared to the number of image frames of the moving pictures. Accordingly, when the motion panoramic image is reproduced, the motion panoramic image may better express the motion of the captured target. The motion panoramic image, which has an angle of view corresponding to an angle of view the still panoramic image, may be an image, in which a captured target included in some of the whole rows of the motion panoramic image move similarly to the movement of the captured target in the moving pictures, when reproduced. The unit of the rows moving similarly to the movement of positions may correspond to the size of each cropped image frame.

The processor 160 may update the motion panoramic image by inserting at least one image frame, which is selected from among image frames of the moving pictures captured in the panorama capturing mode that are not used to create the still panoramic image, into the cropped image frames used to create the still panoramic image. In the case of the motion panoramic image updated as described above, the frame rate (or display rate) for each image frame may be constant when the motion panoramic image is reproduced. The frame rate for each image frame may correspond to (is proportional to) the moving speed of the electronic device when the moving pictures are captured to create the motion panoramic image. Therefore, according to an embodiment, when the motion panoramic image is reproduced, the motion of the captured target may be more natural. Hereinafter, the motion panoramic image will be described while focusing on an updated motion panoramic image.

For example, the processor 160 may select two concatenated image frames from panoramic image frames and may determine a pixel distance (e.g., the size or the number of overlapping rows) between the two image frames. The processor 160 may determine the specified pixel distance to be the determined pixel distance or may determine the specified pixel distance to be a result obtained by adding a threshold error to the determined pixel distance. The processor 160 may create a motion panoramic image such that all image frames have the specified pixel distance. The threshold error may be a constant of '0' or more.

For another example, the processor 160 may determine a pixel distance between a first image frame and a next image frame after the first image frame (or a previous image frame before the first image frame) which is matched to the first image frame to be connected to the first image frame at the boundary part therebetween, in which first image frames are image frames occupying the least portion of image frames of the still panoramic image among the panoramic image frames. Then, the processor 160 may determine the determined pixel distance to be a threshold distance. The processor 160 may select at least one image frame to be complemented, which has a pixel distance less than the threshold distance, from among the panoramic image frames. The processor may create an interpolation image frame for the interpolation between the image frame to be complemented and an image frame adjacent to the image frame to be complemented by using an image frame (previous or next image frame of the image frame to be complemented), which corresponds to the image frame to be complemented, among the whole image frames of the moving picture. The processor 160 may extract the previous image frame and the next image frame of the image frame to be complemented from the panoramic image frames if the processor 160 fails to create the interpolation image frame by using the previous or next image frame of the image frame to be complemented. The processor 160 may create the interpolation image frame by using the extracted image frames. The processor 160 may update a motion panoramic image by adding (or interpolating) the created interpolation frames into a location corresponding to the image frame to be complemented among the panoramic image frames.

The processor 160 may link at least one of motion information, matching position information, or crop top/bottom axis information, which corresponds to each image frame constituting the motion panoramic image, to the image frame and may store the link result. The motion information may be 3D location information of the electronic device at a time that each image frame is captured. The motion information may be used when performing additional interpolation for the motion panoramic image. The matching location information may be the pixel distance of each image frame. The crop top/bottom axis information may be, for example, information on the top and the bottom of a line to be used for matching among whole lines of each image frame. Each image frame constituting the motion panoramic image may be an image frame reproduced when the motion panoramic image is reproduced.

The processor 160 may store image frames (hereinafter, referred to as "spare image frames") which are not included in the motion panoramic image after the motion panoramic image is updated. The processor 160 may link each spare image frame to motion information obtained at a time that the spare image frame is captured and may store the link result in the memory 150.

According to an embodiment, the processor 160 may sequentially reproduce image frames of the motion panoramic image on a full screen of the display 140 in the case of the general reproduction mode. The processor 160 may switch a present mode to the general reproduction mode to reproduce the motion panoramic image if recognizing a specified user input through the input module 120. In the general reproduction mode, the processor 160 may reproduce the motion panoramic image in the form similar to the form of the moving pictures.

According to an embodiment, the processor 160 may reproduce the motion panoramic image based on the motion information of the electronic device 10 in the case of the VR reproduction mode in which a VR appliance (not illustrated) reproduces the motion panoramic image. In the VR reproduction mode, a user may view the motion panoramic image on the display of the VR appliance (not illustrated) and may control the reproduction of the motion panoramic image by moving the head having the VR appliance (not illustrated). Accordingly, the processor 160 may trace the motion of the user head having the VR appliance (not illustrated) by using the motion sensor 130 and may reproduce the panoramic image corresponding to the tracked motion information. Therefore, in the following description, the motion information of the electronic device 10 sensed in the VR reproduction mode is referred to as motion information of a user head. Hereafter, the reproduction of the motion panoramic image by the VR appliance will be described in detail.

According to an embodiment, the processor 160 may receive motion information of the user head by using the motion sensor 130. The motion information may include, for example, at least one of a motion direction, a motion speed of the user head, or a present eye direction (e.g., an angle of yaw).

As described above, the motion sensor 130 may include a first sensor provided in the electronic device 10 and a second sensor provided in a head mount unit. In this case, the processor 160 may determine the motion information of the electronic device 10 by using the first sensor in a capturing mode in which the motion panoramic image is captured and may determine the motion information of the electronic device 10 by using the second sensor in the VR reproduction mode.

According to an embodiment, the processor 160 may determine the reproduction direction corresponding to the motion direction of the user head, a reproduction speed corresponding to the motion speed, and reproduction image frames corresponding to the angle of yaw (the eye direction), based on the motion information in the VR reproduction mode. The processor 160 may reproduce the motion panoramic image by starting from the reproduction image frame among image frames constituting the motion panoramic image. The processor 160 may determine a next image frame in the determined reproduction direction and may reproduce image frames constituting the motion panoramic image at the determined reproduction speed. For example, if the angle of yaw of the user head based on the motion information is 0° (e.g., a direction in which the user head faces the front), the processor 160 may determine an intermediate image frame of the motion panoramic image to be the reproduction image frame. For another example, the processor 160 may determine the reproduction direction to be a right direction if the motion direction of the user head is the right direction based on the motion information. If the motion direction of the user head is the left direction, the processor 160 may determine the reproduction direction to a left direction. Alternatively, the processor 160 may determine the reproduction direction to be the left direction if the motion direction of the user head is the right direction based on the motion information. If the motion direction of the user head is the left direction, the processor 160 may determine the reproduction direction to be right direction. For another example, the processor 160 may acquire the motion information from the motion sensor 130 and may set the selection reproduction speed corresponding to the motion information (speed). The processor 160 may control the reproduction of the motion panoramic image corresponding to the selection reproduction speed. The selection reproduction speed corresponding to the motion speed may be determined through an experiment. For example, if the motion speed is a specified speed, the selection reproduction speed is set to a 1× speed. If the motion speed is less than the specified speed, the selection reproduction speed may be set to less than the 1× speed. If the motion speed exceeds the specified speed, the selection reproduction speed may be set to more than the 1× speed.

The processor 160 may determine whether the reproduction speed is equal to a reference reproduction speed of the motion panoramic image. If the reproduction speed is equal to the reference reproduction speed of the motion panoramic image according to the determination result, the processor 160 may reproduce image frames (or image frames of the moving pictures) at a present time. If the reproduction speed is less than or greater than the reference reproduction speed of the motion panoramic image according to the determination result, the processor 160 may reproduce the motion panoramic image on the display 140 by interpolating or skipping image frames.

When the reproduction speed is less than the reference reproduction speed, the motion panoramic image may be interpolated by using at least one of a spare image frame which is not included in the motion panoramic image or image frames constituting the motion panoramic image. For example, the processor 160 may determine whether the spare image frame corresponding to the present time is present in the memory 150. If the spare image frame is present in the memory 150, the processor 160 may create an interpolation image frame by using the spare image frame. For another example, if the spare image frame is absent from the memory 150, the processor 160 may create the interpolation image frame by using the motion panoramic image. To create one interpolation frame to be inserted between previous and next image frames before and after the present time, the processor 160 may predict the capture location of an image frame at the present time based on the previous and next image frames before and after the present time. In addition, the image change of the image frame at the present time may be predicted by predicting the motions of the previous and next image frames or by analyzing feature values of the previous and next image frames. The processor 160 may create an image frame (that is, interpolation frame) at the present time, which includes the predicted capture location and the predicted image change. For another example, if the selection reproduction speed is a ½× speed, the processor 160 may create an interpolation image frame to be interpolated next to each image frame constituting the motion panoramic image. As described above, according to an embodiment, in the case that the selection reproduction speed based on the user input is less than the reference reproduction speed, the image frame rate of the motion panoramic image is increased, thereby preventing the motion panoramic image from being unnaturally reproduced.

According to an embodiment, the processor 160 may create an interpolation image frame to be naturally connected to previous and next image frames before and after a time that the interpolation image frame is added, by using additional information on the image frame provided at the present time. For example, the processor 160 may determine at least one of motion information, matching location information, or crop top/bottom axis information of previous and next image frames before and after the time that the interpolation image frame is to be added. The processor 160 may determine a crop top/bottom axis by using at least one of the matching location information or the crop top/bottom axis information and may crop the determined crop top/bottom axis to create the interpolation image frame having the continuity with the previous and next image frames. The processor 160 may determine the crop top/bottom axis of the interpolation image frame by additionally using the motion information.

According to an embodiment, the processor 160 may determine the pixel distance of the interpolation image frame by using matching location information of a present image frame and a next image frame and may connect the interpolation image frame to an image frame at a location spaced apart from the reproduction image frame by the determined pixel distance, thereby interpolating the interpolation image frame into the motion panoramic image.

According to an embodiment, the processor 160 may skip a portion of image frames constituting the motion panoramic image if the selection reproduction speed exceeds the reference reproduction speed of the motion panoramic image. For example, the processor 160 may determine an image frame to be skipped from the motion panoramic image based on the ratio between the selection reproduction speed and the reference reproduction speed, if the selection reproduction speed exceeds the reference reproduction speed. The processor 160 may display a motion panoramic image which has no the determined image frame on the display 140. For another example, if the selection reproduction speed is a 2× speed and the reference reproduction speed is 1× speed, the processor 160 may select one of an odd numbered image frame and an even numbered image frame of the motion panoramic image and may reproduce the selected image frames. Therefore, according to an embodiment, in the case that the selection reproduction speed by a user is higher than the reference reproduction speed, the image frame rate of the motion panoramic image is decreased. Accordingly, the user, who is viewing the motion panoramic image, may be less feel dizzy.

According to an embodiment, the processor 160 may selectively reproduce at least one of spare image frames, which are not included in the motion panoramic image, depending on a user input. For example, if the motion speed of the user head is less than the threshold speed, the processor 160 may determine whether a spare image frame corresponding to the angle of yaw is present. The threshold speed is a reference speed used to determine the rotation of the user head. For example, the threshold speed may be 1 cm/s. If the user head is not rotated, the processor 160 may display a menu object for selecting the reproduction of the spare image frame corresponding to the angle of yaw. If the menu object is selected depending on the user input, the processor 160 may display the spare image frame corresponding to the angle of yaw on the display 140. If the menu object is selected, the processor 160 may reproduce spare image frames corresponding to the angle of yaw on the display 140 such that the spare image frames are naturally connected to previous and next image frames corresponding to the angle of yaw. To naturally connect the spare image frames corresponding to the angle of yaw to the previous and next image frames, the spare images need to be cropped and then matched such that the spare images are connected to the previous and next image frames corresponding to the angle of yaw. To this end, the processor 160 may prepare for spare image frames corresponding to a specific area (an angle of yaw) of a motion panoramic image and naturally connected to previous and next image frames at a time that the motion panoramic image is created or updated. In addition, the processor 160 may prepare for the spare image frames corresponding to the angle of yaw and naturally connected to previous and next image frames at a time that the motion panoramic image is reproduced. As described above, according to an embodiment, in the case that the eye (head) of the user stares at any location of a capture space, the processor 160 may selectively reproduce a spare image frame corresponding to the capture space.

According to a previous embodiment, the electronic device 10 connected to the VR (not illustrated) to reproduce a motion panoramic image has been described for the illustrative purpose. However, according to an embodiment, the electronic device 10 may be provided integrally with the VR appliance (not illustrated). For example, according to an embodiment, the electronic device 10 may be a VR appliance.

Figure 2:
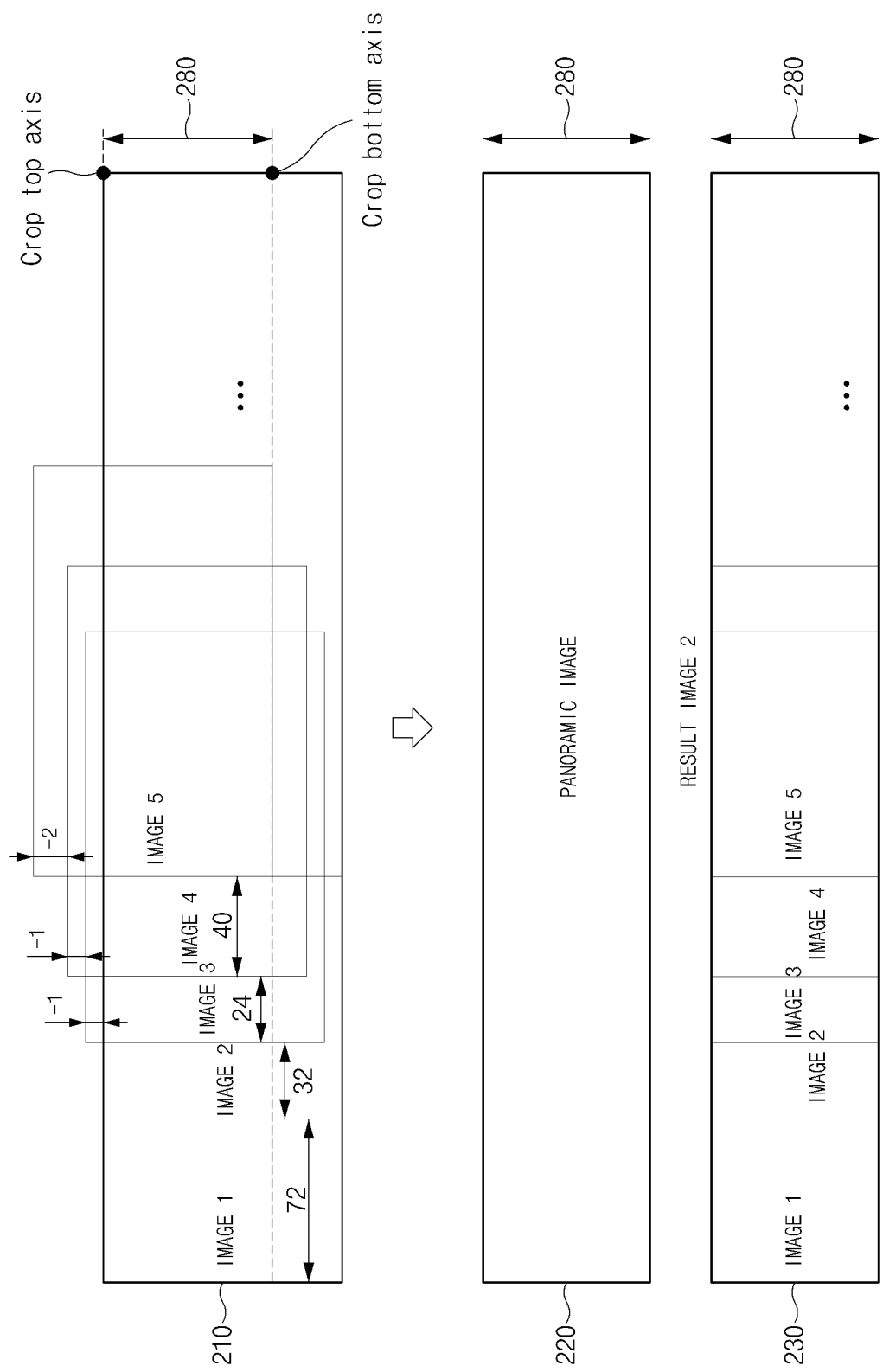
FIG. 2 is a view illustrating a crop top/bottom axis of an image frame included in a panoramic image, according to an embodiment of the present disclosure.

FIG. 2 is a view illustrating a crop top/bottom axis of an image frame included in a panoramic image, according to an embodiment. In FIG. 2, first to fifth image frames (image 1 to image 5), which are panoramic image frames, are result image frames obtained by extracting some from image frames from moving positions captured in the panorama capturing mode and cropping the extracted image frames.

Referring to FIG. 2, as illustrated in state 210, the processor 160 may determine a crop top/bottom axis 280 and a pixel distance to naturally connect boundaries of panoramic image frames to each other based on an image change of the image frames and motion information of the electronic device 10.

For example, tops of crop top/bottom axes (crop top axes) of the first image frame (image 1) and a second image frame (image 2) are aligned in line with each other. The crop top axis of the third image frame (image 3) may be located lower (as measured from the top row of the image) than the crop top axis of the second image frame (image 2) by one pixel. The crop top axis of the fourth image frame (image 4) may be located lower than the crop top axis of the third image frame (image 3) by one pixel. The crop top axis of the fifth image frame (image 5) may be located lower than the crop top axis of the fourth image frame (image 4) by two pixels.

In this case, the processor 160 may determine the crop top axes of the first image frame (image 1) and the second image frame (image 2) to be a first line of image frames. The processor 160 may determine the crop top axis of the third image frame (image 3) to be a second line of the image frames. The processor 160 may determine the crop top axis of the fourth image frame (image 4) to be a third line of the image frames. The processor 160 may determine the crop top axis of the fifth image frame (image 5) to be a fourth line of the image frames. In addition, the processor 160 may determine the bottom (crop bottom axis) of the crop top/bottom axis based on an image frame which has a crop top axis positioned at the lowest location, among the panoramic image frames.

For another example, the processor 160 may determine a pixel distance between a present image frame and a previous image frame based on the continuity of image frames. For example, the pixel distance of the second image frame (image 2) may be determined to be 72 pixels (in the horizontal direction), the pixel distance of the third image frame (image 3) may be determined to be 32 pixels, the pixel distance of the fourth image frame (image 4) may be determined to be 24 pixels, and the pixel distance of the fifth image frame (image 5) may be determined to be 40 pixels.

As illustrated in state 220 of FIG. 2, the processor 160 may crop image frames selected to form a still panoramic image along a crop top/bottom axis and may match the image frames to each other to have the determined pixel distances, thereby creating the still panoramic image. For example, the first image frame (image 1) is subject to matching to have the pixel distance of 72 from the second image frame (image 2). The second image frame (image 2) is subject to matching to have the pixel distance of 32 from the third image frame (image 3). The third image frame (image 3) is subject to matching to have the pixel distance 24 from the fourth image frame (image 4). The fourth image frame (image 4) is subject to matching to have the pixel distance of 40 from the fifth image frame (image 5).

As illustrated in state 230 of FIG. 2, the panoramic image frames may have various pixel distances. Accordingly, if a motion panoramic image is created by using the still panoramic image without change, the motion of images of the capture target included in the motion panoramic image may be unnatural when the motion panoramic image is reproduced.

Figure 3A:
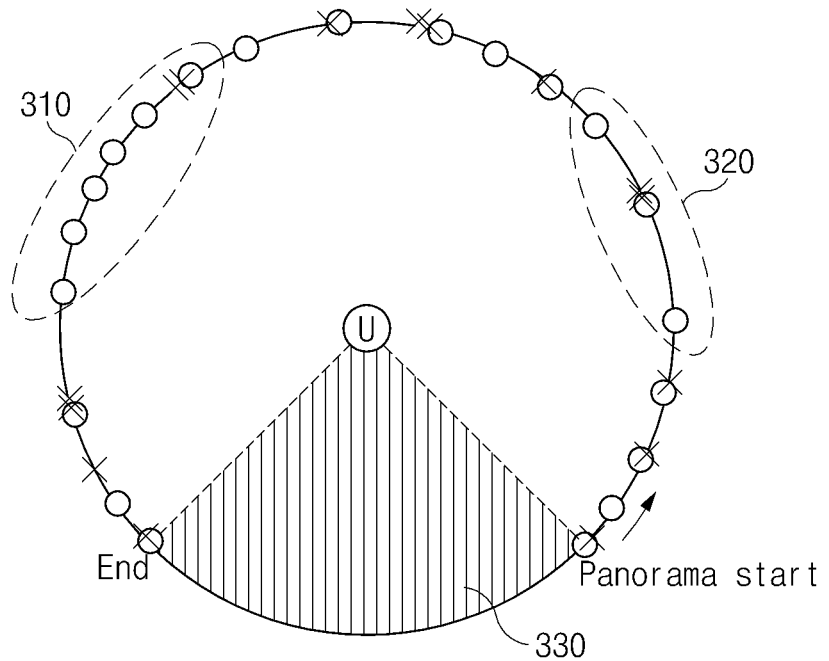
FIG. 3A and FIG. 3B are views illustrating the distribution of image frames in a moving picture and a still panoramic image in a capture space, according to an embodiment of the present disclosure.
Figure 3B:
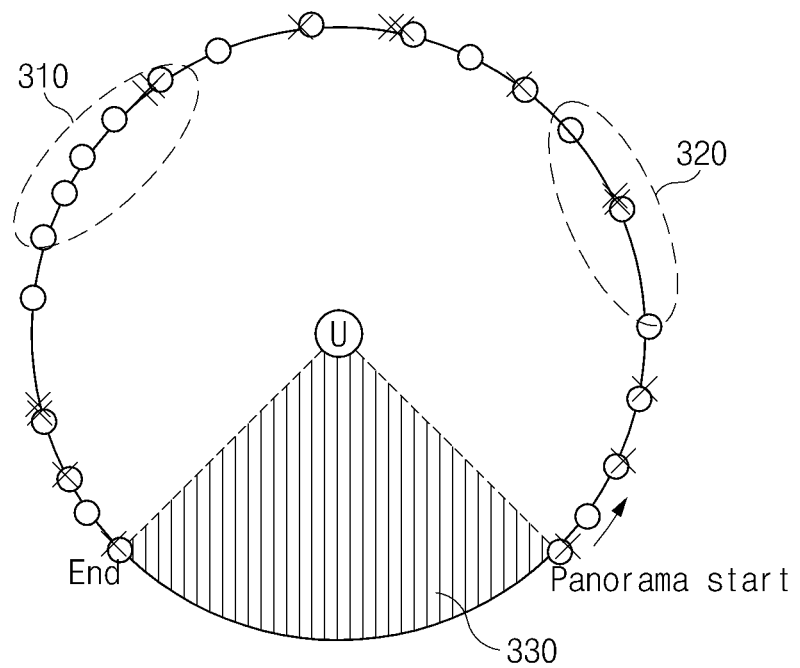

FIGS. 3A and 3B are views illustrating the distribution of image frames from moving positions and a still panoramic image in a capture space, according to an embodiment. In FIGS. 3A and 3B, area 330 (indicated by hatches) may represent a time point at which the moving pictures are not captured. The first time (panorama start) may represent a time to start capturing moving pictures, and the second time (panorama end) may represent a time to complete capturing the moving pictures.

As illustrated in FIGS. 3A and 3B, as long as a photographer does not capture all spaces intentionally or by using machine at a constant velocity, the image frames may not be uniformly distributed throughout all capture spaces.

For example, as illustrated in state 310 of FIGS. 3A and 3B, in the case that the photographer captures an image for a long time at similar places (long-time capture place), a larger number of image frames may be present in the moving pictures captured by the electronic device 10 in relation to the long-time capture place. However, since the image frames for the long-time capture place may include many redundant image frames, the image frames for the long-time capture place may not be used at all or may be less used for a still panoramic image.

For another example, as illustrated in state 320 of FIGS. 3A and 3B, in the case that the photographer captures an image while swiftly moving in a capture space, a smaller number of image frames may be present in moving pictures captured by the electronic device 10 in relation to the capture space in which the photographer captures the image while swiftly moving. However, since image frames for the capture space through the swift moving may less include redundant image frames, a larger number of image frames for the capture space through the swift moving may be used in a still panoramic image. Accordingly, if the motion panoramic image is created by using the still panoramic image without change, image frames for the place (long-time capture place) of interest to a user may be less included in the motion panoramic image and the motion of the capture target may be unnaturally expressed when the motion panoramic image is reproduced. According to an embodiment, a motion panoramic image for expressing a more natural motion may be created by adjusting the distance between image frames constituting the motion panoramic image.

Figure 4:
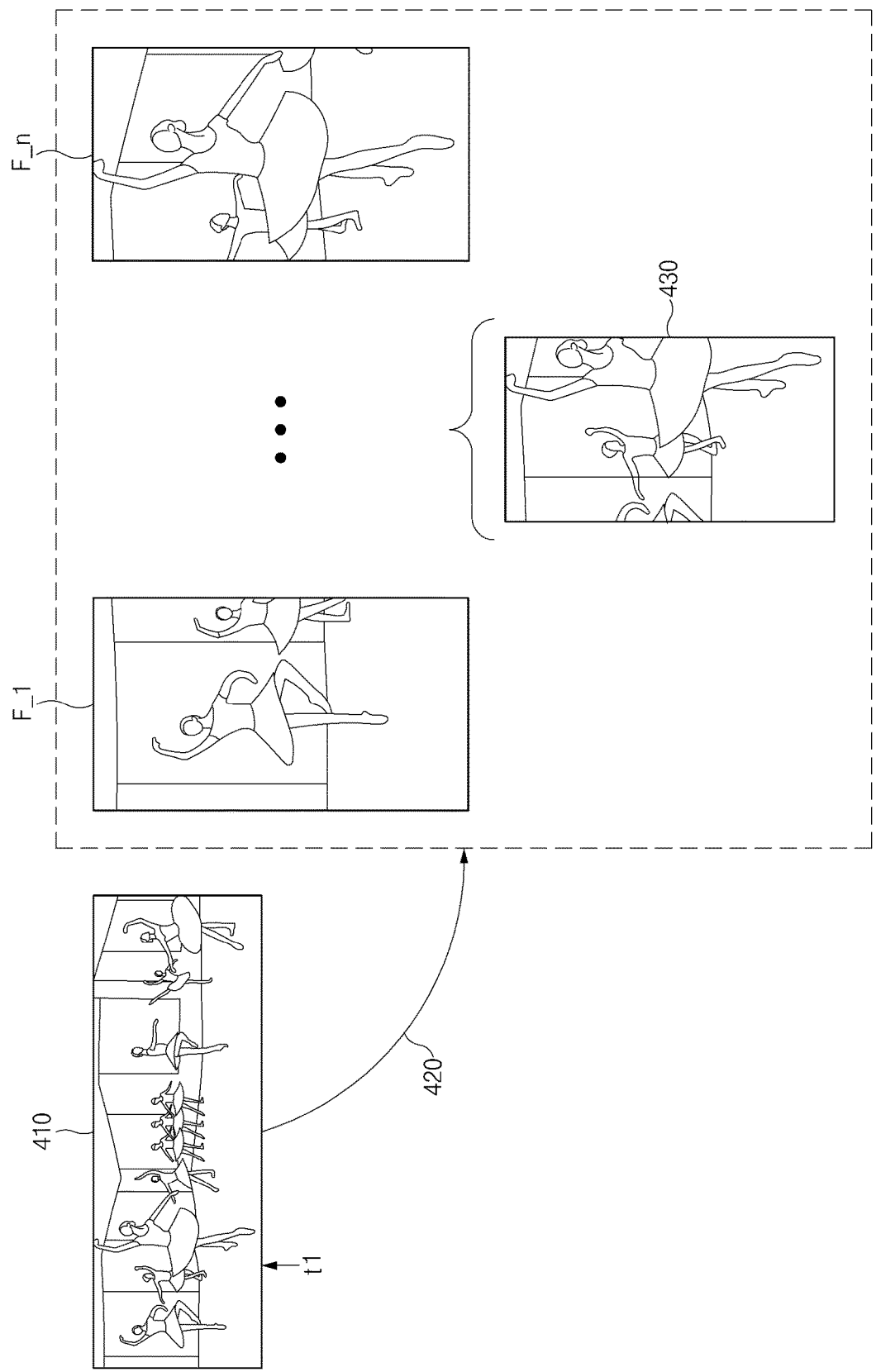
FIG. 4 is a view illustrating that an interpolation image frame is created by using image frames constituting the motion panoramic image, according to an embodiment of the present disclosure.

FIG. 4 is a view illustrating that an interpolation image frame is created by using image frames constituting the motion panoramic image, according to an embodiment.

Referring to FIG. 4, in operation 410, the processor 160 may reproduce a wide motion panoramic image on the display 140 similarly to the still panoramic image in the VR reproduction mode. The processor 160 may determine the generation of an interpolation image frame if the reproduction speed is less than the reference reproduction speed of the motion panoramic image.

In operation 420, the processor 160 may determine, from the memory 150, whether spare image frames are present among the image frames constituting the motion panoramic image in relation to a time t1 that the interpolation image frame is necessary. For example, the processor 160 may determine whether the spare image frames are present in relation to the time t1 by using a time stamp of image frames at the time t1. The time t1 may be determined by, for example, the angle of yaw of the user head.

In operation 430, if the spare image frames are absent in relation to the time t1, the processor 160 may create an interpolation image frame by using previous and next image frames at the time t1 which are included in the image frames constituting the motion panoramic image. For example, the previous and next image frames at the time t1 are subject to matching. If necessary, an interpolation image frame may be created by predicting the motion of the capture target.

Figure 5:
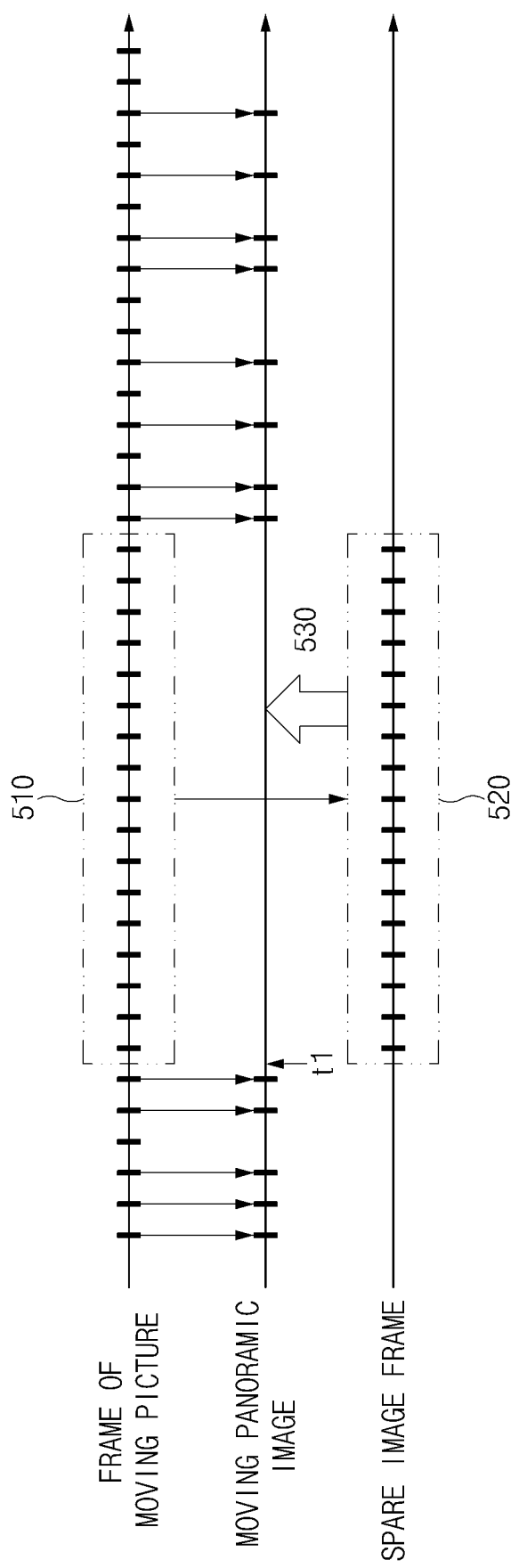
FIG. 5 is a view illustrating that an interpolation image frame of a motion panoramic image is created by using a spare image frame, according to an embodiment of the present disclosure.

FIG. 5 is a view illustrating that an interpolation image frame of the motion panoramic image is created by using a spare image frame, according to an embodiment.

Referring to FIG. 5, in section 510, the processor 160 may determine the existence of the spare image frame to be present for the time t1 that the interpolation image frame is necessary, when the selection reproduction speed is less than the reference reproduction speed.

In section 520, the processor 160 may create the interpolation image frame by using the spare image frames for the time t1. Since the description has been made above regarding a procedure that the processor 160 creates the interpolation image frame by using the spare image frames for the time t1, the details of the procedure will be omitted.

In section 530, the processor 160 may interpolate the interpolation image frame between an image frame at the time t1 of the motion panoramic image and a next image frame after the time t1 and may reproduce the motion panoramic image. Therefore, according to an embodiment, the interpolation image frame may be created to naturally connect a previous image frame to the next image frame.

Figure 6:
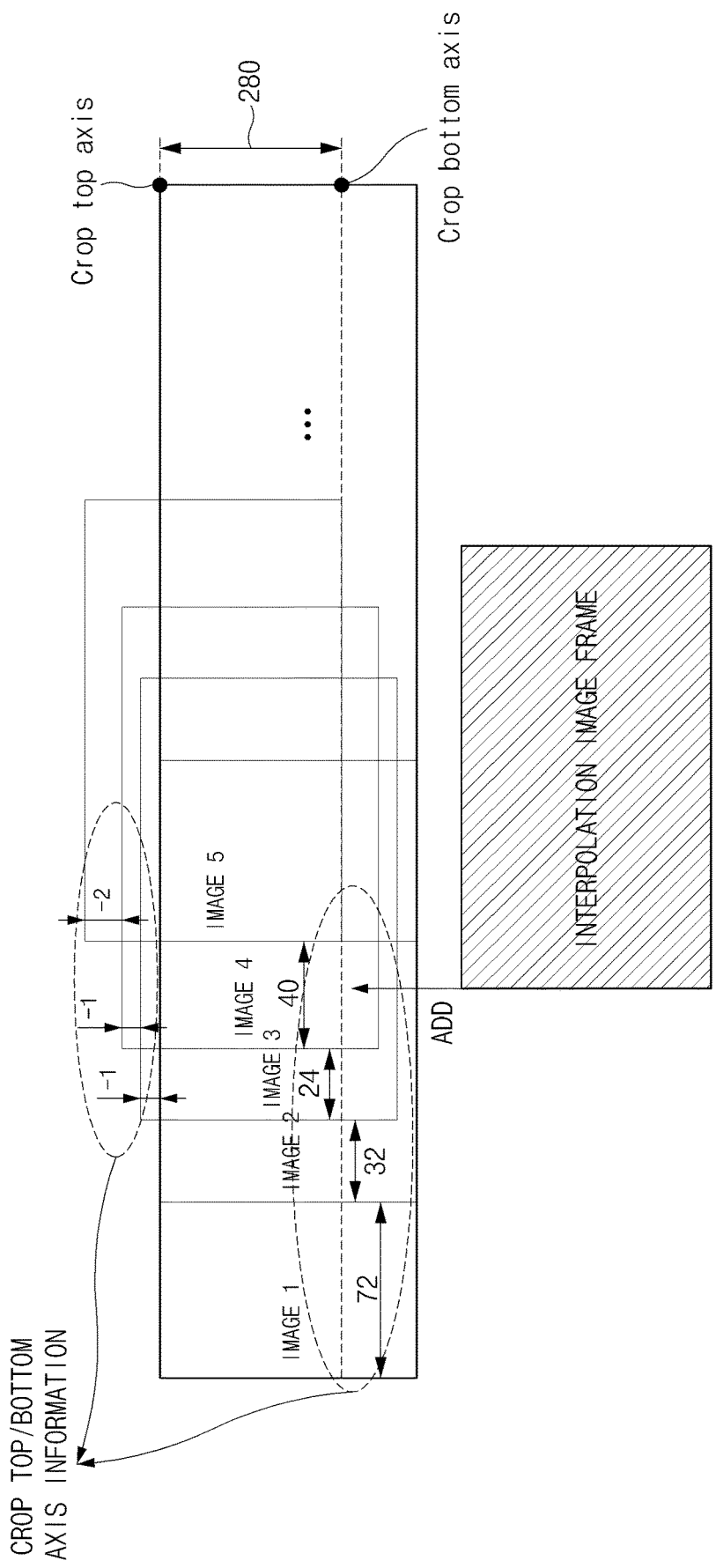
FIG. 6 is a view illustrating a crop top/bottom axis and a pixel distance of the interpolation image frame, according to an embodiment of the present disclosure.

FIG. 6 is a view illustrating a crop top/bottom axis and a pixel distance of the interpolation image frame, according to an embodiment.

Referring to FIG. 6, according to an embodiment, when inserting the interpolation image frame between image frames of the motion panoramic image, the processor 160 may determine the crop top/bottom axis and the pixel distance of the interpolation image frame by using crop top/bottom axis information and matching location information of previous and next image frames before and after a location into which the interpolation image frame is inserted.

For example, in the case that the created interpolation image frame is inserted between the fourth image frame (image 4) and the fifth image frame (image 5), the processor 160 may set a crop top axis of the interpolation image frame to the half (e.g., a second line) of the fourth image frame (image 4) and the fifth image frame (image 5) and may set the pixel distance to the half (e.g., 20) of the fourth image frame (image 4) and the fifth image frame (image 5). Therefore, according to an embodiment, the interpolation image frame may be created and interpolated to naturally connect the previous image frame to the next image frame.

Figure 7A:
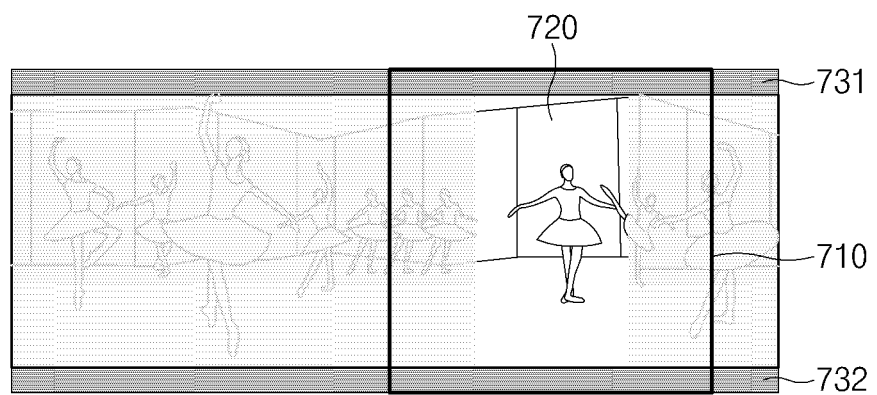
FIG. 7A, FIG. 7B and FIG. 7C are views illustrating that a motion panoramic image is reproduced, according to an embodiment of the present disclosure.
Figure 7B:
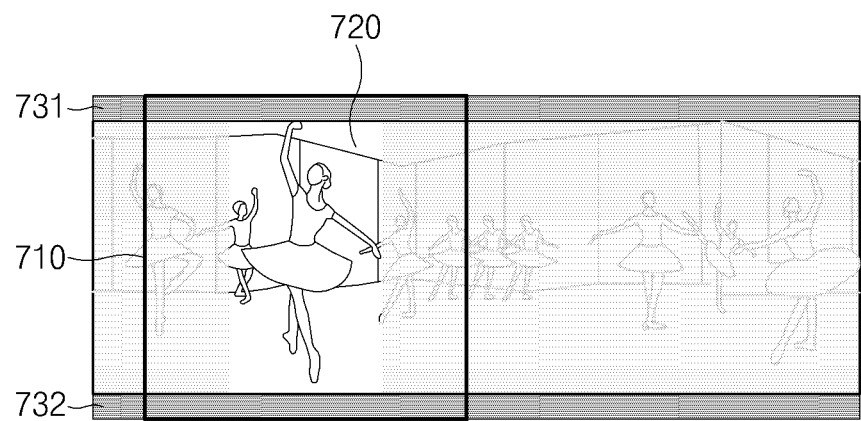
Figure 7C:
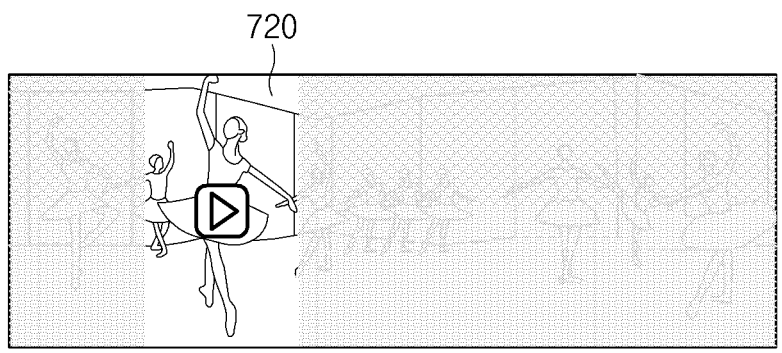

FIGS. 7A to 7C are views illustrating that a motion panoramic image is reproduced, according to an embodiment.

Referring to FIGS. 7A to 7C, according to an embodiment, the processor 160 may display the motion panoramic image at the wide angle of view on the display of the VR appliance (not illustrated), similarly to the still panoramic image.

As illustrated in FIGS. 7A and 7B, the processor 160 may clearly display reproduction image frames 710 of a motion panoramic image, which correspond to the direction of the user head, and may opaquely display image frames (hereinafter, "background image frame") except the reproduction image frame 710. For example, the processor 160 may opaquely display the background image frame by blurring the background image frame. As illustrated in FIGS. 7A and 7B, a first area 720 clearly displayed may be an overlap area between a present image frame and a previous image frame or an overlap area between the present image frame and a next image frame. As a second area and a third area 731 and 732 are cut off by cropping to form the motion panoramic image and thus are not included in image frames constituting the motion panoramic image.

As illustrated in FIG. 7C, the processor 160 may display the reproduction image frames 710 in the form of moving pictures and may display the background image frame in the form of a still image in the case of a motion panoramic image in which the angle of yaw is not changed. If the reproduction of the reproduction image frames 710 corresponding to the angle of yaw is completed, the processor 160 may display the final image frame of the reproduction image frames 710 in the form of a still image.

Figure 8:
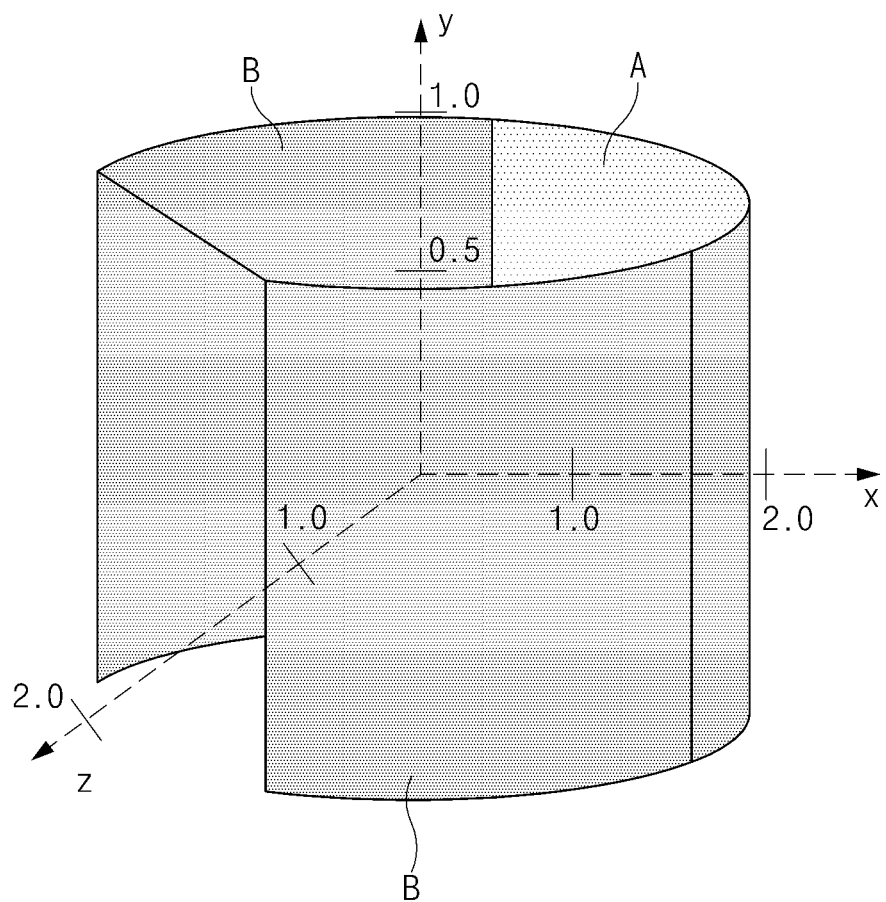
FIG. 8 is a view illustrating that a motion panoramic image is mapped to a 3D cylindrical coordinate system, according to an embodiment of the present disclosure.

FIG. 8 is a view illustrating that the motion panoramic image is mapped to a 3D cylindrical coordinate system, according to an embodiment. FIG. 8 illustrates the 3D cylindrical coordinate system having the radius of 2 m and the height of 1 m. In FIG. 8, area 'A' is to display a reproduction image frame and area 'B' is to display a background image frame.

Referring to FIG. 8, according to an embodiment, the processor 160 may map a motion panoramic image to the 3D cylindrical coordinate system for the easy reproduction of a VR appliance (not illustrated). The 3D cylindrical coordinate system may be formed in shape and size corresponding to a curved display of the VR appliance (not illustrated). The processor 160 may map image frames of a motion panoramic image to 3D cylindrical coordinates at a time that moving pictures are captured. According to an embodiment, the center of the 3D cylindrical coordinate system may be located, for example at the lower center of the cylindrical coordinate system According to an embodiment, the processor 160 may map a reference point (e.g., (0,0) pixel) of each image frame to the 3D cylindrical coordinate system to which the image frame is to be displayed, when the image frame is created (e.g., at a time to capture the moving pictures) For example, the processor 160 may map the leftmost row of the first image frame of the moving pictures to the leftmost y value of the 3D cylindrical coordinates and may map the rightmost row of the last image frame of the moving pictures to the rightmost y value of the 3D cylindrical coordinates. In addition, the processor 160 may map remaining image frames used to form the motion panoramic image to have a pixel distance less than a specified pixel distance formed between the first image frame and the last image frame. The specified pixel distance may be a pixel distance of each image frame of the motion panoramic image. As described above, according to an embodiment, the motion panoramic image may be created and stored in the form allowing easy reproduction on the display 140 depending on the shape of the display 140.

Figure 9:
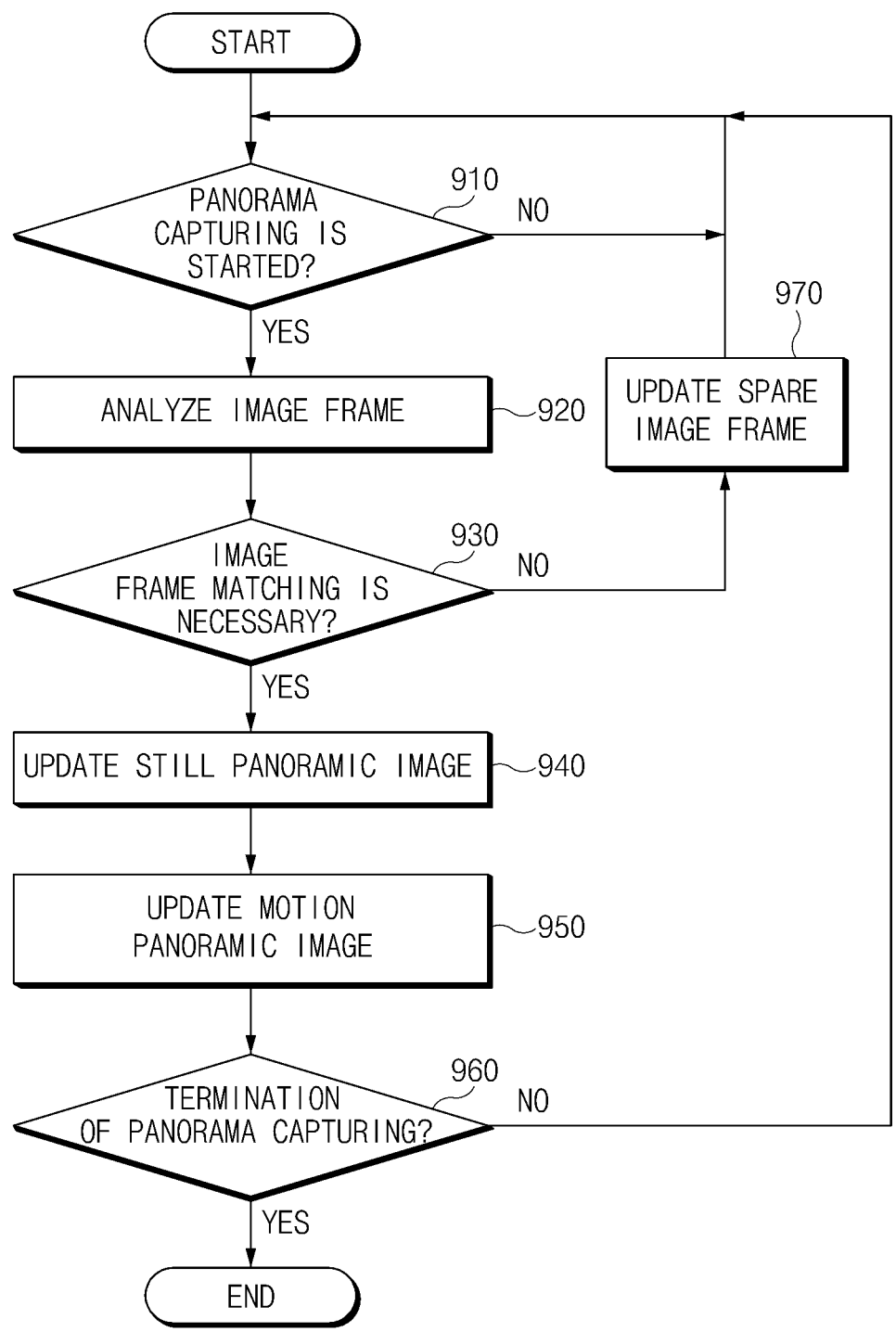
FIG. 9 is a flowchart illustrating a method of ensuring data of the motion panoramic image, according to an embodiment of the present disclosure.

FIG. 9 is a flowchart illustrating a method of ensuring data of the motion panoramic image, according to an embodiment.

Referring to FIG. 9, in operation 910, the processor 160 may determine whether panorama capturing is started. For example, the processor 160 may determine the panorama capturing to be started if receiving a specified user input from the input module 120.

In operation 920, the processor 160 may analyze each image frame of a captured image if the panorama capturing is started. In operation 920, the processor 160 may determine an image change by using at least one of a motion vector or a feature value of the image frame. In operation 920, the processor 160 may determine the movement of a captured location by using the motion sensor 130.

In operation 930, the processor 160 may determine whether image frame matching is necessary by using at least one of the image change or the movement of the captured location. For example, the processor 160 may determine the image frame matching to be necessary if the image change is equal to or greater than the first threshold change or if the movement of the captured location is equal to or greater than the second threshold change.

In operation 940, if the image frame matching is necessary, the processor 160 may crop a present image frame and matches the present image frame to a previous image frame, such that the present image frame is connected to the previous image frame. The processor 160 may determine a crop top/bottom axis and a pixel distance of the present image frame by using motion information and a capture target of the present image frame.

In operation 950, the processor 160 may update a motion panoramic image after updating a still panoramic image. In the case that the motion panoramic image is created after the still panoramic image is completely created, the processor 160 may omit operation 950.

In operation 960, the processor 160 may determine the termination of the panorama capturing while creating or updating the still panoramic image and the motion panoramic image. The processor 160 may repeatedly perform operation 920 to operation 960 with respect to each image frame of from the moving positions until the panorama capturing is terminated.

In operation 970, the processor 160 may store a spare image, which is not included in the still panoramic image frame, in the memory 150 if the image frame matching is not determined to be necessary. The processor 160 may link the spare image frame to the motion information and may store the link result in the memory 150.

Figure 10:
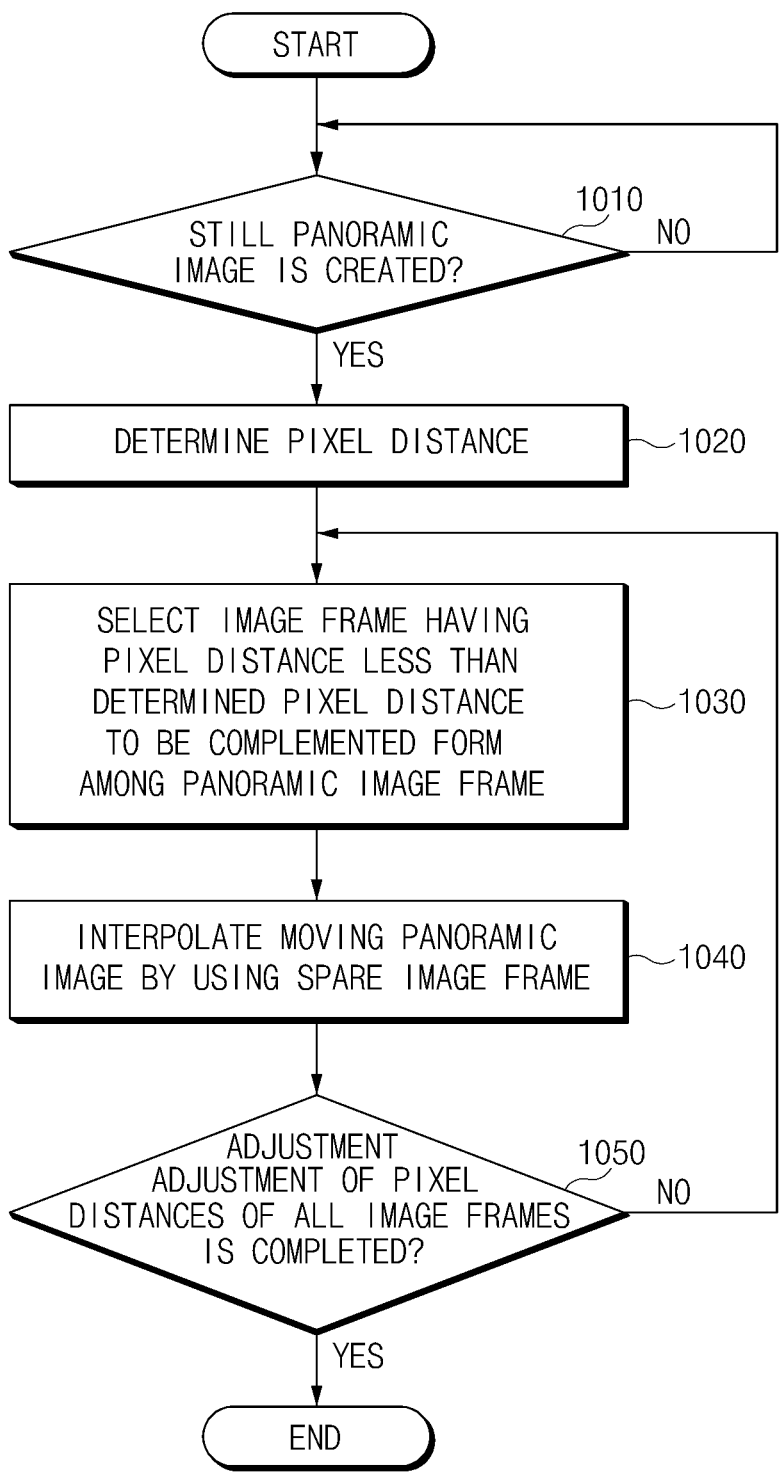
FIG. 10 is a flowchart illustrating a procedure of updating the motion panoramic image, according to an embodiment of the present disclosure.

FIG. 10 is a flowchart illustrating a procedure of updating the motion panoramic image, according to an embodiment.

Referring to FIG. 10, in operation 1010, the processor 160 may determine whether the still panoramic image is completely created.

In operation 1020, if the still panoramic image is completely created, the processor 160 may determine pixel distances of image frames constituting a motion panoramic image by using pixel distances of panoramic image frames. For example, the processor 160 may determine, as the pixel distance of the motion panoramic image, a smaller pixel distance between pixel distances of a first image frame and a previous image frame and a next image frame connected to the boundary part of the first image frame, in which first image frames occupy the least portion of image frames of the still panoramic image.

In operation 1030, the processor 160 may select an image frame having a pixel distance less than the determined pixel distance to be complemented from among panoramic image frames.

In operation 1040, the processor 160 may create at least one interpolation image frame by using spare image frames corresponding to the image frame to be complemented. The processor 160 may insert the at least one interpolation image frame between previous and next images frame before and after the image frame to be complemented. For example, the processor 160 may receive, from the memory 150, the previous image frame or the next image frame before or after the image frame to be complemented among image frames from the moving positions. Then, the processor 160 may crop the previous image frame or the next image frame and create at least one interpolation image frame such that the image frame to be complemented is connected to the previous image frame or the next image frame. The processor 160 may make the pixel distance of the image frame, which is to be complemented, to be equal to or approximate to the determined pixel distance as the at least one interpolation image frame is inserted between the previous image frame or the next image frame before or after the image frame to be complemented.

In operation 1050, the processor 160 may repeatedly perform operation 1030 to operation 1050 until the adjustment of pixel distances of all image frames constituting the motion panoramic image is complemented.

Figure 11:
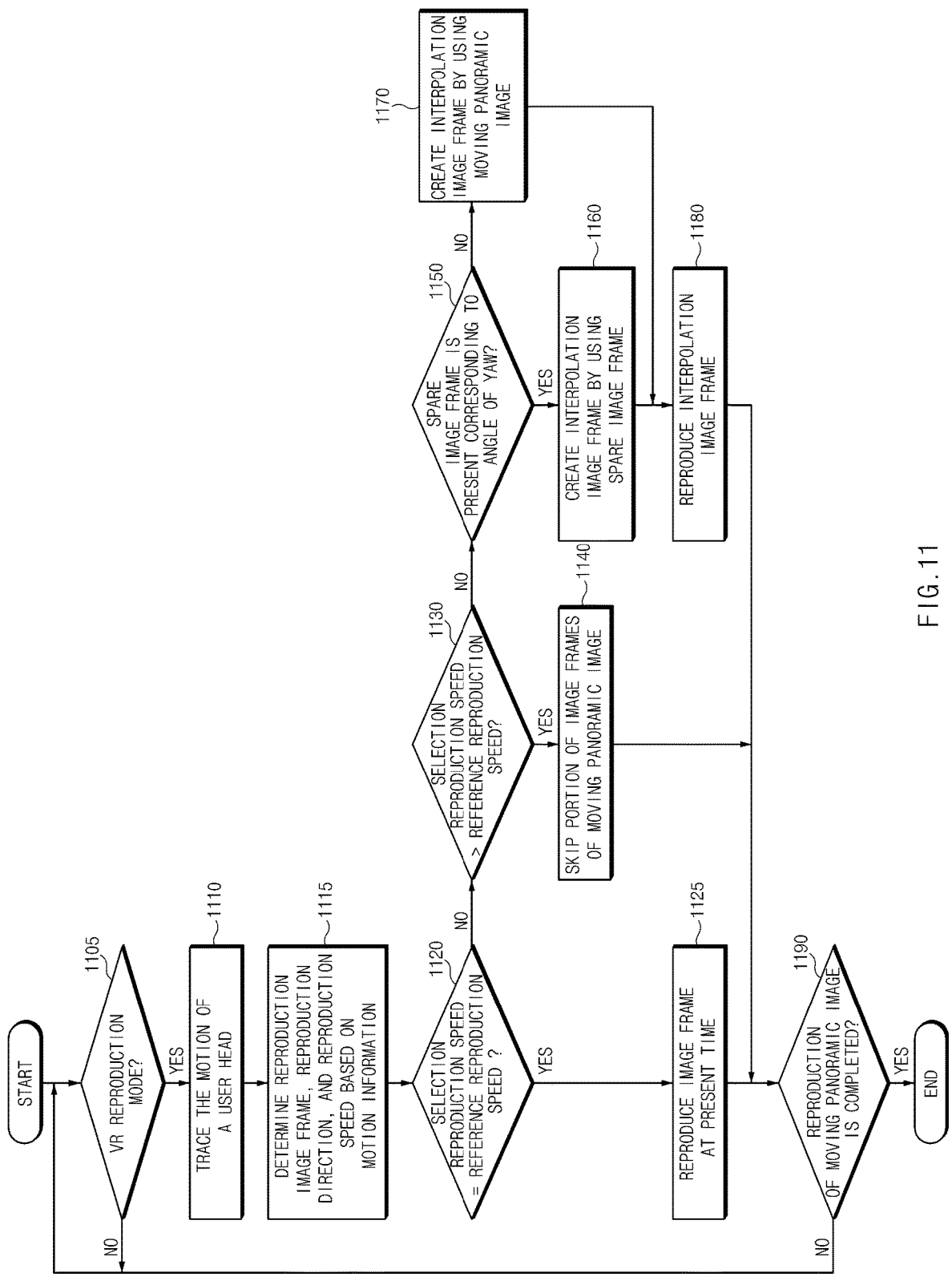
FIG. 11 is a flowchart illustrating a method of reproducing the motion panoramic image, according to an embodiment of the present disclosure.

FIG. 11 is a flowchart illustrating a method of reproducing the motion panoramic image, according to an embodiment.

Referring to FIG. 11, in operation 1105, the processor 160 may determine whether the VR reproduction mode comes. For example, the processor 160 may determine the VR reproduction mode to come if receiving a specified user input through the input module 120. For another example, the processor 160 may determine the connection to a VR appliance (not illustrated) through an interface with the VR appliance (not illustrated) and then may determine the VR reproduction mode to come if receiving the specified user input.

In operation 1110, the processor 160 may trace the motion of a user head by using the motion sensor 130 in the VR reproduction mode. For example, the processor 160 may determine a motion direction (e.g., a rotation direction), a motion speed (e.g., a rotational speed), and an angle of yaw of the user head by using the motion sensor 130.

In operation 1115, the processor 160 may determine a reproduction image frame, a reproduction direction, and a reproduction speed based on motion information. For example, the processor 160 may determine the reproduction image frame by using the angle of yaw of the user head, may determine the reproduction direction by using the motion direction, and may determine a selection reproduction speed by using the motion speed.

In operation 1120, the processor 160 may determine whether the selection reproduction speed is equal to a reference reproduction speed. The reference reproduction speed, which corresponds to the pixel distance of the motion panoramic image, may be, for example, a 1× speed.

In operation 1125, the processor 160 may reproduce an image frame at a present time if the selection reproduction speed is equal to the reference reproduction speed.

In operation 1130, the processor 160 may determine whether the selection reproduction speed exceeds the reference reproduction speed if the selection reproduction speed is not equal to the reference reproduction speed.

In operation 1140, the processor 160 may skip some of image frames of the motion panoramic image corresponding to the ratio between the selection reproduction speed and the reference reproduction speed if the selection reproduction speed exceeds the reference reproduction speed. For example, if the selection reproduction speed is a 2× speed and if the reference reproduction speed is a 1× speed, the processor 160 may skip one of an odd numbered image frame and an even numbered image frame of the motion panoramic image and may reproduce a remaining one.

In operation 1150, the processor 160 may determine whether spare image frames are present corresponding to the image frame at the present time, which is stored in the memory 150, if the selection reproduction speed is less than the reference reproduction speed.

In operation 1160, the processor 160 may create at least one interpolation image frame if the spare image frames are present corresponding to the image frame at the present time. For example, the processor 160 may create at least one interpolation image frame by the multiple of the reference reproduction speed corresponding to the selection reproduction speed by using at least one image frame, which is next to the image frame at the present time, among image frames from the moving positions. For another example, if the selection reproduction speed is a ½× speed, the processor 160 may create one interpolation image frame to be inserted between the image frame at the present time and an image frame at a next time. In operation 1160, the processor 160 may determine at least one of motion information or crop top/bottom axis information of previous and next image frames before and after the present time and may create an interpolation image frame having continuity with previous and next image frames before and after the present time by using at least one of the motion information or the crop top/bottom axis information.

In operation 1170, the processor 160 may create at least one interpolation image frame by using the image frame at the present time and the image frame at the next time if the spare image frames corresponding to the image frame at the present time are absent. For example, the processor 160 may create at least one interpolation image frame to be interpolated between the image frame at the present time and the image frame at the next frame based on at least one of the motions or image changes of the image frame at the present time and the image frame at the next time.

In operation 1180, the processor 160 may insert the at least one interpolation image frame, which is created in operation 1170 or operation 1160, between the image frame at the present time and the image frame at the next time and may display the interpolation image frame on the display 140.

In operation 1190, the processor 160 may perform at least one of operation 1110 to operation 1180 until receiving a user input of instructing reproduction termination or reproduction stop through the input module 120 or until determining the completion of the reproduction of the motion panoramic image.

Figure 12:
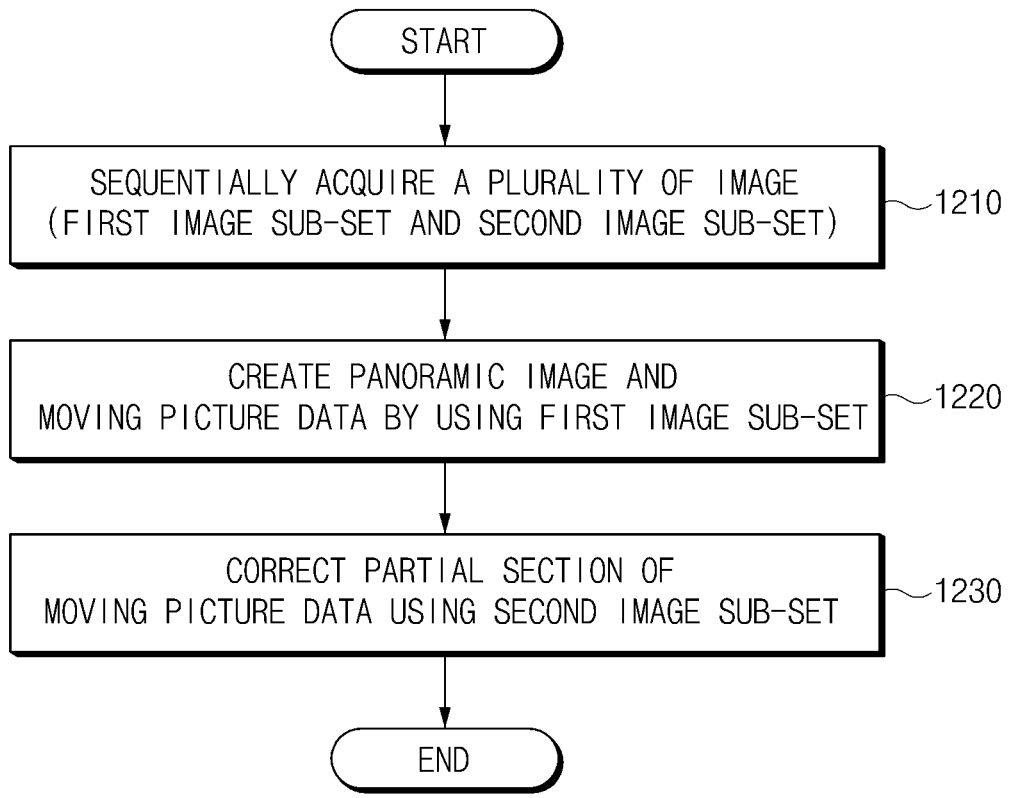
FIG. 12 is a flowchart illustrating a method of creating moving picture data, according to an embodiment of the present disclosure.

FIG. 12 is a flowchart illustrating a method of creating moving picture data of an electronic device, according to an embodiment disclosed in the present disclosure.

Referring to FIG. 12, in operation 1210, the processor 160 may sequentially acquire a plurality of images using a camera for a specified time. The image data may include a first image sub-set and a second image sub-set. In operation 1210, the processor 160 may acquire motion information (e.g., 3D location information of the electronic device) corresponding to the images by using the sensor (e.g., a motion sensor). The first image sub-set may include a portion of the plurality of images (e.g., whole image frames constituting moving pictures). The second image sub-set may include another portion of the plurality of images.

In operation 1220, the processor 160 may create a panoramic image (e.g., still panoramic image) mapped in a specified shape to a virtual space by using the first image sub-set and may create moving picture data (e.g., motion panoramic image) related to the panoramic image data. For example, the first image sub-set may include image frames having the image change, which is determined to be a first threshold change or more, or having the movement of the captured location which is determined to be a second threshold change or more (see operation 930 of FIG. 9).

In operation 1230, the processor 160 may correct at least a partial section of the moving picture data by using image data (e.g., spare image frames corresponding to the image frame to be completed) corresponding to a partial section of moving picture data in the second image sub-set if the frame rate of the at least a partial section of the moving picture data satisfies a specified condition. For example, if the frame rate of the at least a partial section of the moving picture data is less than the specified frame rate, the processor 160 may correct the partial section of the moving picture data by using the image data corresponding to the at least a partial section of the moving picture data in the second image sub-set. The specified frame rate may be, for example, a frame rate of the first image frame occupying the least portion of the still panoramic image.

An electronic device 10 includes a camera 110; a sensor configured to sense a motion; and one or more processors 160. The one or more processors are configured to sequentially acquire a plurality of images using the camera and acquire motion information of the plurality of images using the sensor, for a specified time; create a panoramic image with a first image sub-set comprising a portion of the plurality of images and a second image sub-set comprising another portion of the plurality of images, and moving picture data related to the panoramic image; and determine whether to correct at least a partial section of the moving picture data by using a particular image from the second image sub-set that corresponds to the at least the partial section of the moving picture data, based on the frame rate of the at least the partial section of the moving picture data.

The one or more processors are configured to store the motion information corresponding to the first image sub-set as meta data of the panoramic image data and the moving picture data.

The one or more processors are configured to correct the at least the partial section of the moving picture data when the frame rate of the at least the partial section of the moving picture data is less than a specified frame rate.

The one or more processors are configured to extract the particular image corresponding to the at least the partial section of the moving picture data, through at least a portion of an operation of correcting the at least the partial section of the moving picture data; and correct the at least the partial section of the moving picture data by using the extracted particular image.

The one or more processors are configured to insert the particular image into a frame of the at least a partial section of the moving picture data, through at least a portion of an operation of correcting the at least a partial section of the moving picture data, if the at least a partial section of the moving picture data is determined to be corrected.

The one or more processors are configured to skip at least the portion of the at least a partial section of the moving picture data, when the frame rate of the at least a partial section of the moving picture data exceeds a specified frame rate.

The one or more processor are configured to acquire a plurality of images, which corresponds to a first area of the panoramic image, from the second image sub-set; and create moving picture data corresponding to the first area by using the acquired plurality of images.

An electronic device includes a memory; a camera configured to capture a moving picture; and one or more processors. The one or more processors are configured to create a still panoramic image by using first image frames selected from among the plurality of image frames of the moving picture and store the still panoramic image in the memory; create a motion panoramic image by using the first image frames and second image frames including at least another portion of the plurality of image frames and store the motion panoramic image in the memory; and form the motion panoramic image by matching the first image frames using the second image frames such that the first image frames include overlap areas having less than a threshold size, wherein overlap areas between the first image frames have irregular sizes.

The one or more processors are configured to select two image frames, which are concatenated together, from among the first image frames; and determine an area size, which is obtained by adding a threshold error to a size of an overlap area between the two image frames, to become the threshold size.

The one or more processors are configured to store the plurality of image frames, wherein the still panoramic image is created using only the first image frames, wherein images of the plurality of images that are not among the first image are spare image frames.

The one or more processors are configured to link at least one of matching position information corresponding to sizes of overlap areas of the second image frames, or crop top/bottom axis information representing a degree in which tops and bottoms of the second image frames are cut off from image frames of the moving picture, to the spare image frames and store the link result in the memory.

The electronic device further includes a motion sensor 130 configured to sense a motion of the electronic device; and a display. The one or more processors are configured to receive a motion direction, a motion speed, and an angle of yaw of the electronic device from the motion sensor if a present mode is a specified reproduction mode; and reproduce the second image frames in a reproduction direction, which corresponds to the motion direction, from an image frame corresponding to the angle of yaw, and wherein the second image frames are reproduced on the display at a reproduction speed corresponding to the motion speed.

An electronic device includes a display 140; a motion sensor configured to sense a motion of the electronic device; a memory 150 configured to store a motion panoramic image created by using image frames constituting a still panoramic image; and one or more processors 160. The one or more processors are configured to determine a motion direction, a motion speed, and an angle of yaw, based on information received from the motion sensor, if a present mode is a specified reproduction mode; and reproduce image frames constituting the motion panoramic image in a reproduction direction, which corresponds to the motion direction, from an image frame corresponding to the angle of yaw and at a selection reproduction speed corresponding to the motion speed.

The one or more processors are configured to interpolate or skip the motion panoramic image to reproduce the motion panoramic image, if the selection reproduction speed is not equal to a reference reproduction speed of the motion panoramic image.

The one or more processors are configured to determine whether a spare image frame corresponding to the angle of yaw is present in the memory when the reproduction speed is less than the reference reproduction speed; create at least one interpolation image frame by using the spare image frame corresponding to the angle of yaw if the spare image frame corresponding to the angle of yaw is present in the memory; and add the at least one interpolation image frame to the motion panoramic image to reproduce the motion panoramic image on the display.

The one or more processors are configured to determine at least one of matching position information or crop top/bottom axis information of previous and next image frames of the motion panoramic image, which are provided before and after a time that the at least one interpolation image frame is added to the motion panoramic image; and create the at least one interpolation image frame by using the at least one of the matching position information or the crop top/bottom axis information such that the interpolation image frame has continuity with the previous and next image frames.

The processor is configured to create the at least one interpolation image frame by using the motion panoramic image if the spare image frame corresponding to the angle of yaw is absent from the memory.

The processor is configured to determine an image frame to be skipped from the image frames constituting the motion panoramic image, based on a ratio between the selection reproduction speed and the reference reproduction speed, if the selection reproduction speed exceeds the reference reproduction speed; and reproduce remaining image frames, which constitute the motion panoramic image except the image frame to be skipped, on the display.

The one or more processors are configured to determine whether a spare image frame corresponding to the angle of yaw is present if the motion speed is less than a threshold speed; and display a menu object, which is used for reproducing the spare image frame corresponding to the angle of yaw, on the display if the spare image frame corresponding to the angle of yaw is present.

The one or more processors are configured to determine whether the menu object is selected by a user input via input module 120; and reproduce the spare image frame corresponding to the angle of yaw on the display such that the spare image frame corresponding to the angle of yaw is connected between previous and next image frames before and after an image frame corresponding to the angle of yaw, if the menu object is selected.

The term "module" as used in the present disclosure may represent, for example, a unit including one or more combinations of hardware, and hardware programmed with software. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to an embodiment of the present disclosure may be, for example, implemented by instructions stored in a computer-readable storage media in the form of a program module. The instruction, when executed by a processor 160, may cause the one or more processors to perform a function corresponding to the instruction. The computer-readable storage media, for example, may be the memory 150.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as generated by a compiler but also a high-level language code executable on a computer using an interpreter. The above hardware unit may be configured to operate via one or more software modules for performing an operation according to an embodiment of the present disclosure, and vice versa.

A module or a program module according to an embodiment of the present disclosure may include at least one of the above elements, or a part of the above elements may be omitted, or additional other elements may be further included. Operations performed by a module, a program module, or other elements may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a camera;
   a sensor configured to sense a motion; and
   one or more processors,
   wherein the one or more processors are configured to:
   for a specified period of time, sequentially acquire a plurality of images using the camera including a first image sub-set and a second image sub-set, and acquire motion information of electronic device associated with the plurality of images using the sensor;
   create a panoramic image mapped in a specified shape to a virtual space, and a moving picture data related to the panoramic image, using the first image sub-set; and
   determine whether to correct at least a partial section of the moving picture data based on a frame rate of the at least the partial section of the moving picture data,
   wherein correction of the partial section of the moving picture data is completed using a particular image from the second image sub-set corresponding to the partial section.

2. The electronic device of claim 1, wherein the one or more processors are configured to:
   store the motion information associated with the plurality of images as meta data of the panoramic image and the moving picture data.

3. The electronic device of claim 1, wherein the one or more processors are configured to:
   correct the at least the partial section of the moving picture data when the frame rate of the at least the partial section of the moving picture data is less than a prespecified threshold frame rate.

4. The electronic device of claim 1, wherein the one or more processors are configured to:
   extract the particular image corresponding to the at least the partial section of the moving picture data through at least a portion of an operation of correcting the at least the partial section of the moving picture data; and
   correct the at least the partial section of the moving picture data by using the extracted particular image.

5. The electronic device of claim 1, wherein the one or more processors are configured to:
   insert the particular image into a frame of the at least a partial section of the moving picture data, through at least a portion of an operation of correcting the at least a partial section of the moving picture data, if the at least a partial section of the moving picture data is determined to be corrected.

6. The electronic device of claim 1, wherein the one or more processors are configured to:
   skip at least a portion of the at least the partial section of the moving picture data, when the frame rate of the at least a partial section of the moving picture data exceeds a specified frame rate.

7. The electronic device of claim 1, wherein the one or more processors are configured to:
   acquire a plurality of images, which corresponds to a first area of the panoramic image, from the second image sub-set; and
   create moving picture data corresponding to the first area by using the acquired plurality of images.

* * * * *